United States Patent

Medawar et al.

[15] 3,665,709
[45] May 30, 1972

[54] THRUST REVERSING APPARATUS

[72] Inventors: George E. Medawar, San Diego; Leonard Holman, Imperial Beach, both of Calif.

[73] Assignee: Rohr Corporation, Chula Vista, Calif.

[22] Filed: June 4, 1970

[21] Appl. No.: 43,470

[52] U.S. Cl. ............................................60/226 A, 60/232
[51] Int. Cl. ...................................................F02k 3/06
[58] Field of Search ............................................60/226, 232

[56] References Cited

UNITED STATES PATENTS

| | | | |
|---|---|---|---|
| 3,511,055 | 5/1970 | Timms | 60/226 A |
| 3,483,702 | 12/1969 | Ward | 60/226 A |
| 3,262,268 | 7/1966 | Beavers | 60/226 A |
| 3,500,644 | 3/1970 | Hom | 60/226 A |
| 3,541,794 | 11/1970 | Johnston | 60/226 A |

*Primary Examiner*—Clarence R. Gordon
*Attorney*—George E. Pearson

[57] ABSTRACT

Fan jet engine has cowl surrounding engine and terminating in jet exhaust nozzle. Elongate shroud surrounds fan and engine to define annular passage for fan air terminating forward of exit end of nozzle. Aft portion of shroud is separate sleeve movable axially to define peripheral outflow gap for fan air. Ring of cascade sets occupies gap and carries blocker doors pivoted at their aft ends to swing into contact with engine cowl, blocking rearward flow of air and diverting it out through cascade ring. Sleeve encloses cascade ring and blocker doors in stowed position and is linked to doors to deploy them when sleeve moves rearward to deployed position. Linkage has lost motion so doors deploy only during last stage of deploying movement of sleeve.

4 Claims, 3 Drawing Figures

INVENTOR.
GEORGE E. MEDAWAR
BY LEONARD HOLMAN

ATTORNEY

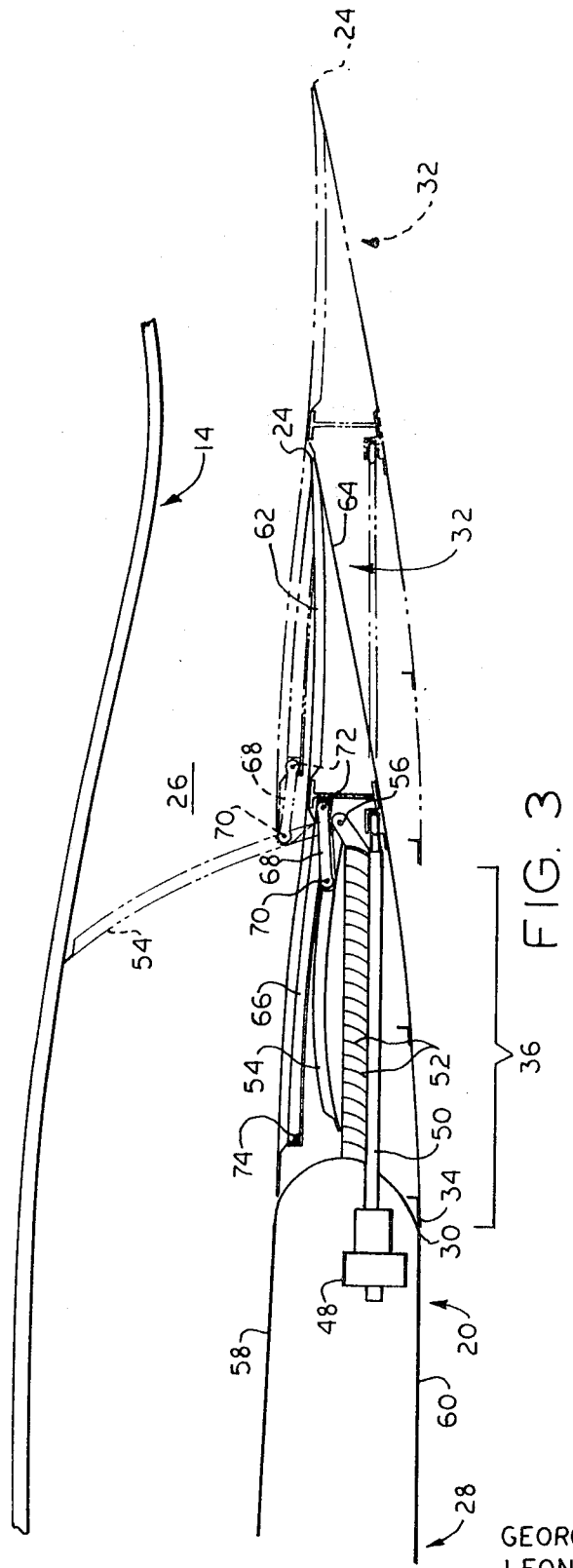

3,665,709

THRUST REVERSING APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine, and is directed to thrust reversing apparatus primarily for the fan type of jet engine in which a nacelle or shroud surrounds the engine in and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

As is the case with all jet type engines, the airplanes which are equipped with them have high landing speeds which place a heavy burden on the wheel brakes. To reduce this burden, most airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the side walls of the nozzle or a surrounding shroud together with blocker doors which swing toward the engine axis to block rearward flow and extend outward to direct the diverted flow laterally and forwardly. Still another type utilizes cascade sets in the side walls of the jet or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity and is highly reliable in operation. Generally stated, the apparatus includes an elongate shroud which surrounds the fan and engine and provides an annular passage for fan air, the passage terminating forward of the exit end of the exhaust gas nozzle. The main body of the shroud is fixed and carries the aft section for axial sliding movement. The aft section is a sleeve completing the streamline shape of the shroud, and its forward end meets the aft end of the main body in sealing relation in a transverse plane when the sleeve is in its forward stowed position. When the sleeve is deployed to its aft position, a peripheral outflow gap is defined between the sleeve and main body.

A series of cascade sets are arranged in a substantially complete peripheral ring in the outflow gap so that air flowing out through the gap will be given a forward component to produce reverse thrust. A series of blocker doors are pivoted at their aft ends to the cascade sets to swing to deployed positions with their leading edges in contact with the engine cowl, blocking rearward flow of the air and redirecting it out through the cascade ring. The sleeve is linked to the doors in such fashion that they are moved to deployed position in response to the final stage of deploying movement of the sleeve. The sleeve is double walled and open at its forward end so that it will enclose the cascade ring and the stowed doors when the sleeve is in stowed position.

BRIEF DESCRIPTION OF THE DRAWINGS

Various other advantages and features of novelty will become apparent as the description proceeds in conjunction with the accompanying drawings, in which:

FIG. 3 is a schematic sectional view taken on line 3—3 of FIG. 2.

DESCRIPTION OF PREFERRED EMBODIMENT

Figure 1:
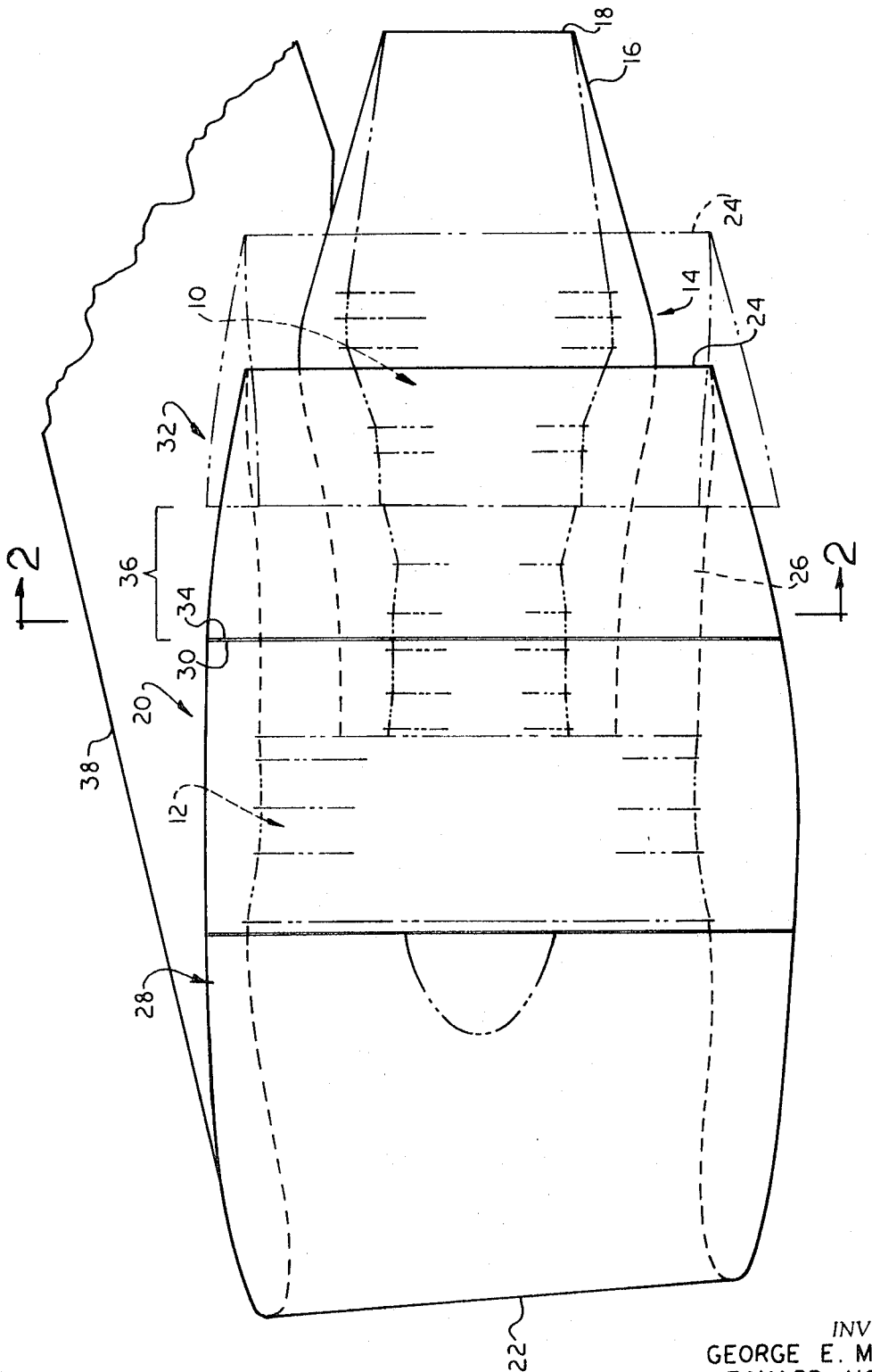
FIG. 1 is a schematic side elevational view showing a complete engine installation with the sleeve in stowed position.

The apparatus of this invention is generally schematically illustrated in FIG. 1, in which the engine 10 is provided with a fan 12. A cowl 14 terminates rearwardly in a discharging exhaust gas nozzle 16 having an exit end 18. An elongate shroud 20, which is generally coaxial with the engine, surrounds the engine and fan with its forward end 22 well ahead of the fan to constitute an air inlet and its aft end 24 terminating forward of the exit end 18 of the nozzle. As shown, it terminates substantially at the transverse plane of maximum diameter of the engine cowl to define a convergent jet air flow passage 26 for the air which is directly driven rearwardly by the fan and does not pass through the turbine.

The shroud actually includes two distinct sections. The larger, forward, main body 28 is fixed with respect to the engine and fan and has an aft edge 30 lying in a transverse plane. The aft section is in the form of a sleeve 32 having a leading edge 34 adapted to mate with aft edge 30 when the sleeve is in the stowed position as shown. The sleeve is slidably supported on guide tracks carried by the main body for axial movement to the deployed position indicated in broken lines in FIG. 1 to open peripheral gap 36 for outflow of fan air during thrust reversal.

Figure 2:
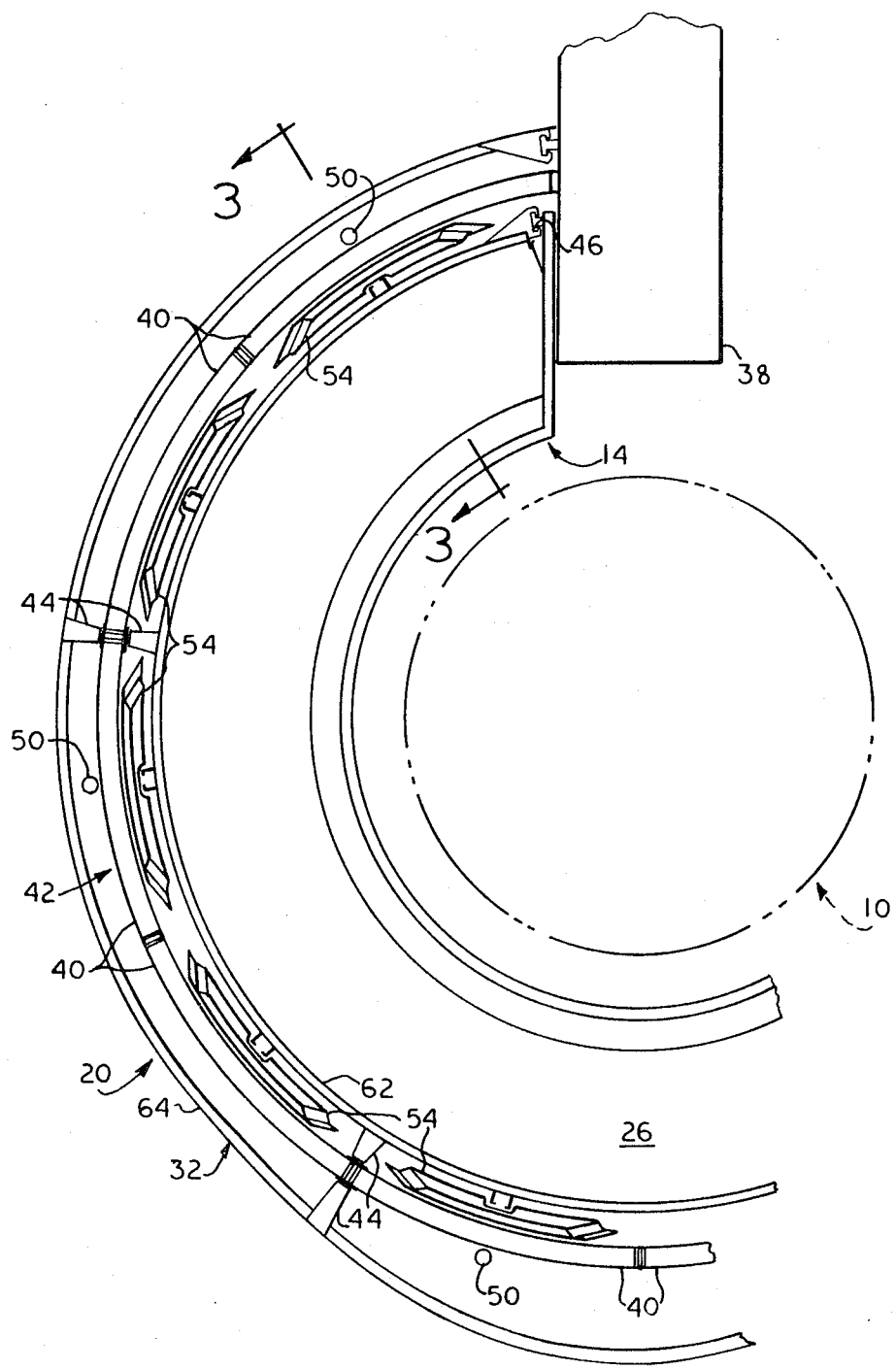
FIG. 2 is a schematic view taken on line 2—2 of FIG. 1.

As will be seen in FIG. 2, the engine, cowl, and shroud are all supported on a pylon 38 which is suitably secured to a structural member of a wing or other part of an airplane. A series of cascade units 40 are secured to the main body 28 and extend rearward therefrom a distance approximately equal to the axial extent of the gap. They are arranged in side by side relation and secured to each other to form a substantially complete cascade ring 42. Guide and support means 44, 46 are spaced around the periphery of the ring to support the sleeve 32 in its axial movement, which is provided by actuator 48 and shaft 50. The vanes 52 in the cascade units, shown in FIG. 3, are spaced and shaped to provide a forward component in the fan air flow outward therethrough.

A plurality of blocker doors 54 are pivotally connected at their aft ends to the cascade ring by means of pivotal mounting means 56 to allow the forward ends of the doors to swing into contact with cowl 14, as shown in the broken line position, blocking rearward flow of the air and redirecting it out through the cascade ring. The main body has inner and outer walls 58 and 60 which enclose the actuator. The sleeve also has inner and outer walls 62 and 64 which taper to the thin and closed aft end 24 while their forward ends have the same spacing as walls 58 and 60, so that they will contact them in sealing relation when the sleeve is stowed. It will be noted that in stowed position the hollow sleeve completely encloses the cascade ring and the blocker doors, providing a smooth imperforate wall for passage 26. Since the blocker doors are housed when not in use, it is possible to give them the most efficient shape for their purpose, as shown, without any interference with the air flow during normal flight operation.

The doors may be swung between stowed and deployed positions directly by the actuator with suitable linkage means. However, it is presently preferred to cause actuation of the doors by movement of sleeve 32. For this purpose the inner side of inner wall 62 of the sleeve is provided with at least one link track 66 extending axially for each door. At least one link 68 is provided for each door and is pivotally connected to the door at 70 and pivotally and slidably connected to track 66 at 72. As the sleeve moves axially rearward, track 66 slides relative to pin 72. During the final phase of rearward movement of the sleeve, detent 74 at the forward end of track 66 engages pin 72, exerting a rearward force on link 68 and swinging doors 54 to their forwardly converging position. During the first portion of the deploying movement of the sleeve, the doors are held in stowed position overlying the cascade sets by pressure of the air flowing through passage 26.

Since the track has a sliding relation with pin 72, it will not immediately act to stow the doors. However, the leading edge of wall 62 will contact the rear faces of the doors and swing them all to stowed position during the initial phase of its stowing movement.

The apparatus is illustrated as being associated with a front fan type of engine. However, it will be apparent that it will operate in the same way in association with a rear fan type. Moreover, it is equally suitable for use with a conventional jet engine, in which case the shroud would extend aft of the nozzle exit and the blocker doors would be shaped to meet at the center line of the engine in order to fully block rearward flow of the exhaust gases from the nozzle.

It will be apparent that a cascade type thrust reverser has been disclosed which has a minimum number of moving parts and which is highly reliable and adds a minimum weight to the total installation. The hollow wall construction of the sleeve enables complete enclosure of the cascade ring and blocker doors without any additional structure, and the enclosure of the blocker doors permits optimum configuration of the doors without disturbing the streamlined flow passage during cruising flight.

What is now claimed as new and useful and desired to be secured by U. S. Letters Patent is:

1. Thrust reversing apparatus for use in combination with a fan type jet engine having a fan and an elongate coaxial cowl surrounding the engine and terminating in a rearwardly directed jet exhaust nozzle, comprising: an elongate shroud generally coaxial with the engine, surrounding the engine and fan and spaced outwardly of the cowl to form an annular passage between the cowl and shroud for rearward flow of fan air and terminating forward of the exit end of the nozzle; the shroud including a fixed forward main body having an aft edge lying in a transverse plane and an aft section in the form of an axially movable sleeve having a leading edge adapted to mate with the aft edge of the main body; support means on the main body to support the the sleeve for said axial movement between a first, stowed, forward position in which the leading edge of the sleeve engages the aft edge of the main body in sealing relation and a second, deployed, aft position in which the leading edge of the sleeve is spaced rearward of the aft edge of the main body to produce a peripheral gap for outflow of fan air; a plurality of reverse flow cascade sets fixedly secured to the aft end of the main body in juxtaposition to each other to form a substantially complete peripheral cascade ring extending rearwardly a distance substantially equal to the axial length of the outflow gap and adapted to lie within the outer wall of the stowed sleeve; a plurality of blocker doors pivotally mounted at their aft ends to the cascade sets for swinging between stowed positions generally parallel to and overlying the cascade sets and deployed positions converging forwardly with their forward ends engaging the cowl, blocking rearward flow of air and diverting the air outward through the cascade ring; the doors being movable to their deployed positions in conjunction with rearward movement of the sleeve to deployed position; linkage means connecting the doors to the sleeve to cause them to move to deployed position in response to movement of the sleeve to deployed position; said linkage means being constructed and arranged to cause deploying movement of the doors only during the final portion of the deploying movement of the sleeve; and said linkage means including for each door an axially extending track fixed to the sleeve and a link pivotally connected at its forward end to the door and pivotally and slidably connected at its aft end to the track; and detent means at the forward end of the track to engage the link pivotal mounting and pull the link rearward during final deploying movement of the sleeve.

2. Thrust reversing apparatus for use in combination with a fan type jet engine having a fan and an elongate coaxial cowl surrounding the engine and terminating in a rearwardly directed jet exhaust nozzle; comprising: an elongate shroud generally coaxial with the engine, surrounding the engine and fan and spaced outwardly of the cowl to form an annular passage between the cowl and shroud for rearward flow of fan air and terminating forward of the exit end of the nozzle; the shroud including a fixed forward main body having an aft edge lying in a transverse plane and an aft section in the form of an axially movable sleeve having a leading edge adapted to mate with the aft edge of the main body; support means on the main body to support the sleeve for said axial movement between a first, stowed, forward position in which the leading edge of the sleeve engages the aft edge of the main body in sealing relation and a second, deployed, aft position in which the leading edge of the sleeve is spaced rearward of the aft edge of the main body to produce a peripheral gap for outflow of fan air; a plurality of reverse flow cascade sets fixedly secured to the aft end of the main body in juxtaposition to each other to form a substantially complete peripheral cascade ring extending rearwardly a distance substantially equal to the axial length of the outflow gap and adapted to lie within the outer wall of the stowed sleeve; a plurality of blocker doors pivotally mounted at their aft ends to the cascade sets for swinging between stowed positions generally parallel to and overlying the cascade sets and deployed positions converging forwardly with their forward ends engaging the cowl, blocking rearward flow of air and diverting the air outward through the cascade ring; the doors being movable to their deployed positions in conjunction with rearward movement of the sleeve to deployed position; and said shroud having inner and outer spaced walls; said sleeve having inner and outer walls in tapered relation joined at their aft ends to form a thin trailing edge and spaced at their forward ends to mate with the aft ends of the inner and outer walls of the main body and serving to fully enclose the cascade ring and the blocker doors when the sleeve is in stowed position.

3. Apparatus as claimed in claim 2; the forward edge of the inner wall of the sleeve contacting the doors and serving to return them to stowed position during the initial portion of the stowing movement of the sleeve.

4. Thrust reversing apparatus for use in combination with a jet engine, comprising: a streamlined shroud surrounding the engine and having radially spaced inner and outer walls; the shroud including a fixed forward main body having an aft edge lying in a transverse plane and an aft section in the form of an axially movable sleeve having a leading edge adapted to mate with the aft edge of the main body; support means on the main body to support the sleeve for said axial movement between a first, stowed, forward position in which the leading edge of the sleeve engages the aft edge of the main body in sealing relation and a second, deployed, aft position in which the leading edge of the sleeve is spaced rearward of the aft edge of the main body to produce a peripheral gap for outflow of gases, a plurality of reverse flow cascade sets fixedly secured to the aft end of the main body in juxtaposition to each other to form a substantially complete peripheral cascade ring extending rearward a distance substantially equal to the axial length of the outflow gap and adapted to lie within the outer wall of the stowed sleeve; and a plurality of blocker doors pivotally mounted at their aft ends to the cascade sets for swinging between stowed positions generally parallel to and overlying the cascade sets and deployed positions converging forwardly to block rearward flow of gases and to divert them outward through the cascade ring; the doors being movable to their deployed positions in conjunction with rearward movement of the sleeve to deployed position, each of said doors having an axially extending track fixed to the sleeve and a link pivotally connected at its forward end to the door and pivotally and slidably connected at its aft end to the track; and detent means at the forward end of the track to engage the link pivotal mounting and pull the link rearward during final deploying movement of the sleeve.

* * * * *